(12) United States Patent
Liu et al.

(10) Patent No.: US 10,084,843 B2
(45) Date of Patent: Sep. 25, 2018

(54) SYSTEM AND METHOD FOR WEB CONTAINER PARTITIONS IN A MULTITENANT APPLICATION SERVER ENVIRONMENT

(71) Applicant: ORACLE INTERNATIONAL CORPORATION, Redwood Shores, CA (US)

(72) Inventors: Steven Liu, Beijing (CN); Rajiv Mordani, Sunnyvale, CA (US); Joseph Di Pol, Sunnyvale, CA (US); Xin Li, Beijing (CN); Liang Zhang, Beijing (CN); Miranda Cheng, Beijing (CN)

(73) Assignee: ORACLE INTERNATONAL CORPORATION, Redwood Shores, CA (US)

( * ) Notice: Subject to any disclaimer, the term of this patent is extended or adjusted under 35 U.S.C. 154(b) by 262 days.

(21) Appl. No.: 14/799,273

(22) Filed: Jul. 14, 2015

(65) Prior Publication Data
US 2016/0014191 A1    Jan. 14, 2016

Related U.S. Application Data

(60) Provisional application No. 62/024,367, filed on Jul. 14, 2014, provisional application No. 62/055,347, filed on Sep. 25, 2014.

(51) Int. Cl.
*H04L 29/08* (2006.01)
*H04L 12/24* (2006.01)

(52) U.S. Cl.
CPC .............. *H04L 67/02* (2013.01); *H04L 41/08* (2013.01); *H04L 67/10* (2013.01)

(58) Field of Classification Search
CPC ........................... G06F 2209/542; G06F 9/547
See application file for complete search history.

(56) References Cited

U.S. PATENT DOCUMENTS

2008/0071922 A1*  3/2008  Chetuparambil ....... G06F 9/547
                                                        709/236
2011/0213829 A1*  9/2011  Concini ................. G06F 9/547
                                                        709/203

(Continued)

OTHER PUBLICATIONS

Danny Coward, Java TM Servlet Specification Version 2.4, Nov. 24, 2003, p. 20.*

(Continued)

*Primary Examiner* — Oleg Survillo
*Assistant Examiner* — Christopher P Cadorna
(74) *Attorney, Agent, or Firm* — Tucker Ellis LLP

(57) ABSTRACT

In accordance with an embodiment, described herein is a system and method for providing web container partitions in an application server environment. The application server environment can include a domain with one or more partitions, each partition associated with one or more virtual targets, and each virtual target including configuration information for a web server that hosts one or more applications deployed to that virtual target. Each virtual target can register configuration information of its associated web server with a web container. When receiving a request for accessing an application in a particular partition, the web container can examine information in the host header of the request and virtual target configuration information in the web container, to find a matching web server for dispatching the request.

20 Claims, 8 Drawing Sheets

(56) References Cited

U.S. PATENT DOCUMENTS

2011/0213870 A1    9/2011  Cai
2012/0072597 A1    3/2012  Teather
2012/0110566 A1    5/2012  Park
2014/0095589 A1*  4/2014  Johnson .................. H04L 67/42
                                                                                                     709/203

OTHER PUBLICATIONS

Orcale, Multitenant, Jun. 2013 per document (Jul. 18, 2013 per internet wayback machine), pp. 9-11; http://www.oracle.com/technetwork/database/multitenant-wp-12c-1949736.pdf.*
European Patent Office, International Searching Authority, International Search Report and Written Opinion dated April 24, 2015 for International Application No. PCT/US2015/012268 , 10 pages.

* cited by examiner

SYSTEM AND METHOD FOR WEB CONTAINER PARTITIONS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR WEB CONTAINER PARTITIONS IN A MULTITENANT APPLICATION SERVER ENVIRONMENT", Application No. 62/024,367, filed Jul. 14, 2014; U.S. Provisional Application titled "SYSTEM AND METHOD FOR WEB CONTAINER PARTITIONS IN A MULTITENANT APPLICATION SERVER ENVIRONMENT", Application No. 62/055,347, filed Sep. 25, 2014; and is related to U.S. Patent Application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for providing web container partitions in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

Accordingly, such a cloud environment needs to be able to discriminate requests from different users, so that a request from a particular user can be dispatched to the applications of the user in the cloud environment.

SUMMARY

In accordance with an embodiment, described herein is a system and method for providing web container partitions in an application server environment. The application server environment can include a domain with one or more partitions, each partition associated with one or more virtual targets, and each virtual target including configuration information for a web server that hosts one or more applications deployed to that virtual target. Each virtual target can register configuration information of its associated web server with a web container. When receiving a request for accessing an application in a particular partition, the web container can examine information in the host header of the request and virtual target configuration information in the web container, to find a matching web server for dispatching the request.

DETAILED DESCRIPTION

In accordance with an embodiment, described herein is a system and method for providing web container partitions in an application server environment. The application server environment can include a domain with one or more partitions, each partition associated with one or more virtual targets, and each virtual target including configuration information for a web server that hosts one or more applications deployed to that virtual target. Each virtual target can register configuration information of its associated web server with a web container. When receiving a request for accessing an application in a particular partition, the web container can examine information in the host header of the request and virtual target configuration information in the web container, to find a matching web server for dispatching the request.

Application Server (e.g., Multi-Tenant, MT) Environment

Figure 1:
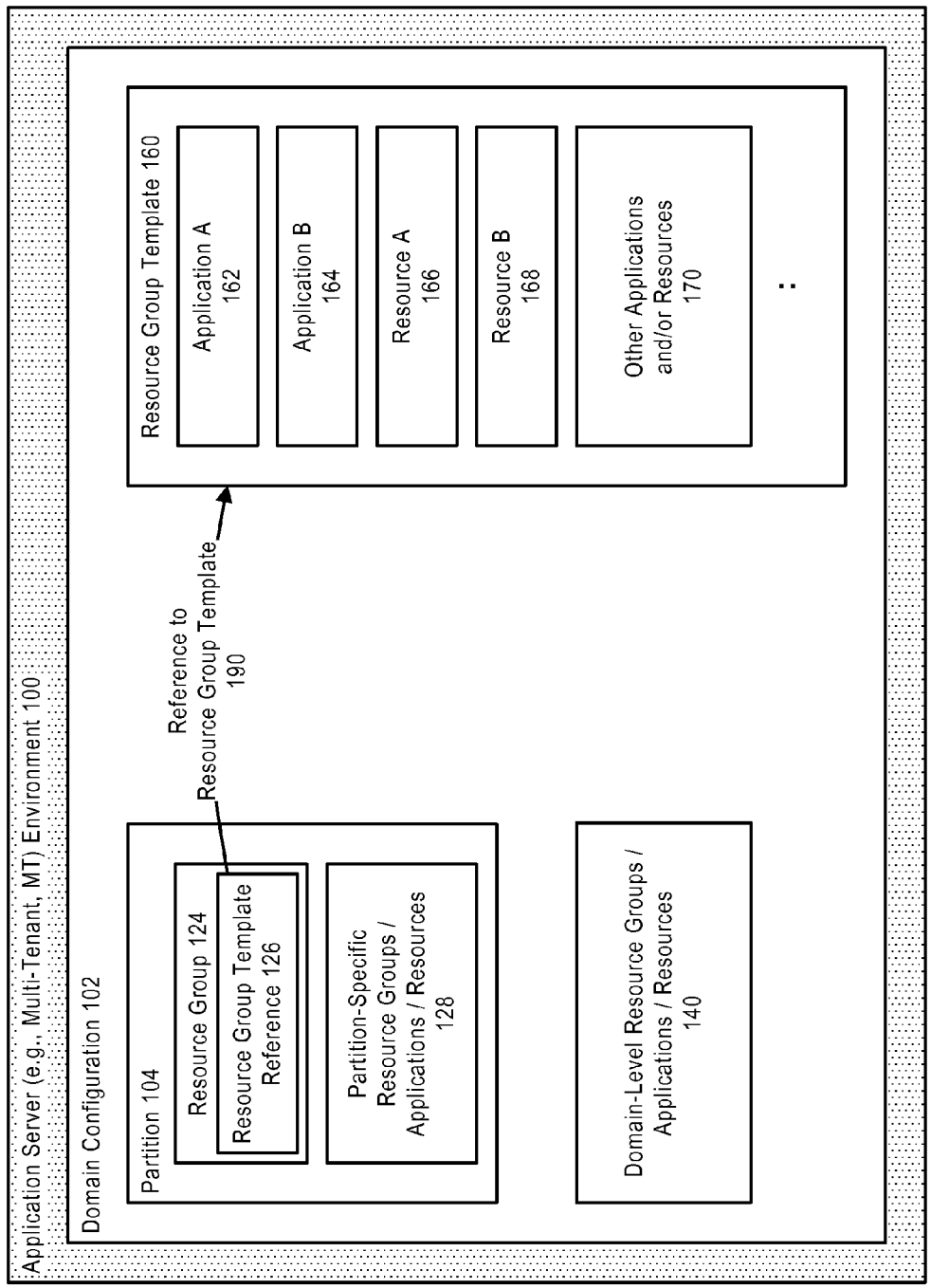
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
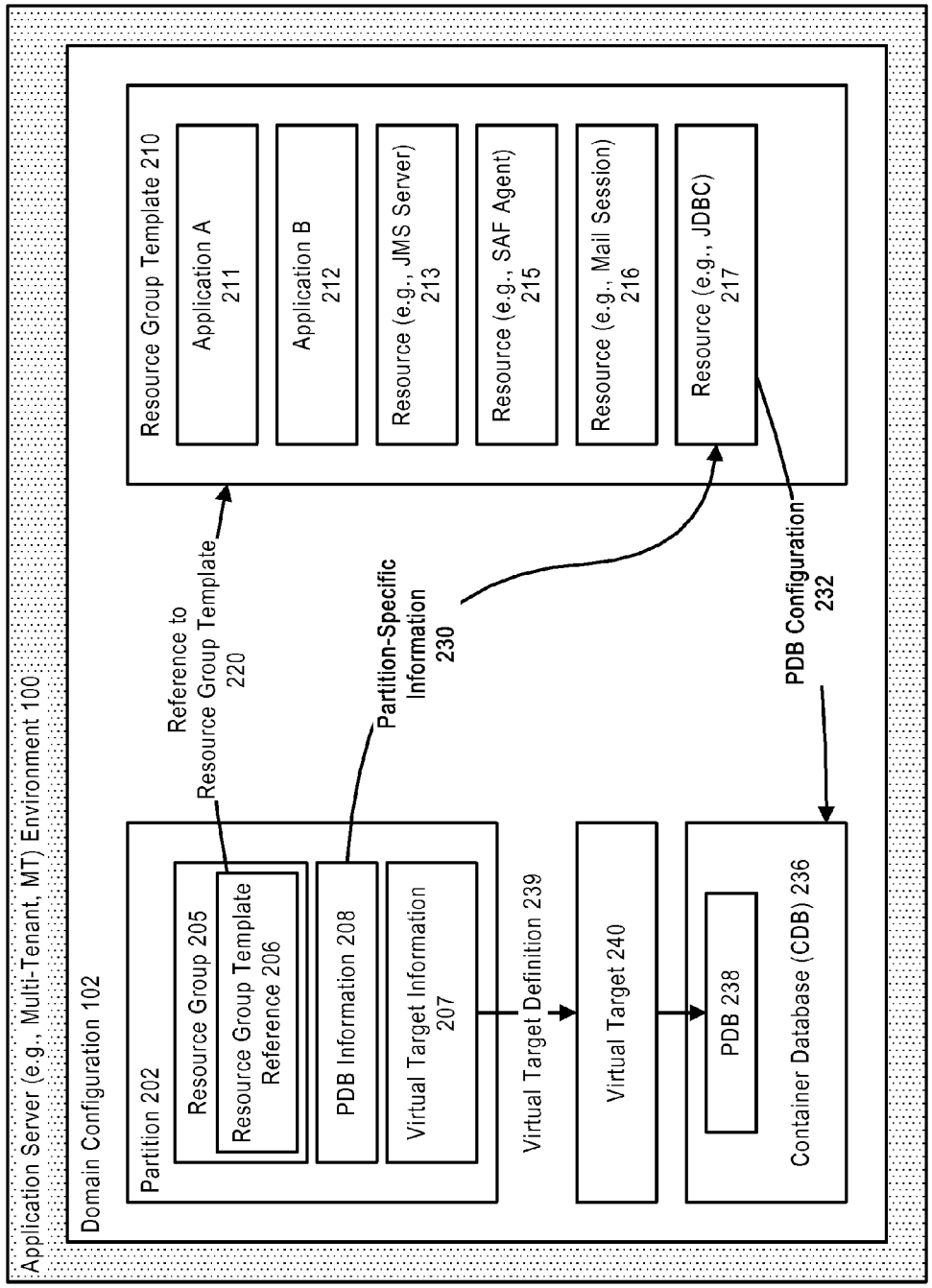
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
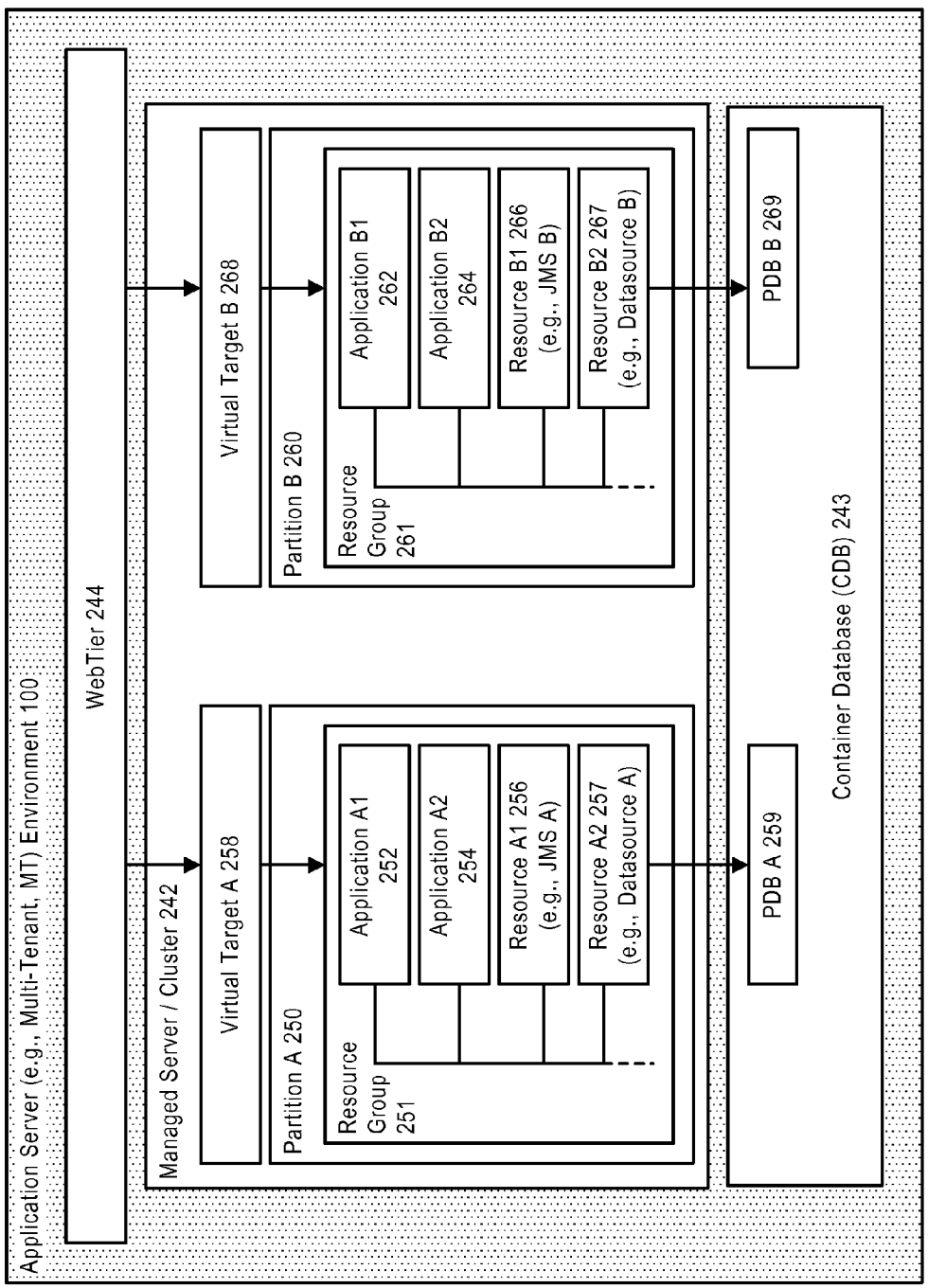
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM Data Username}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
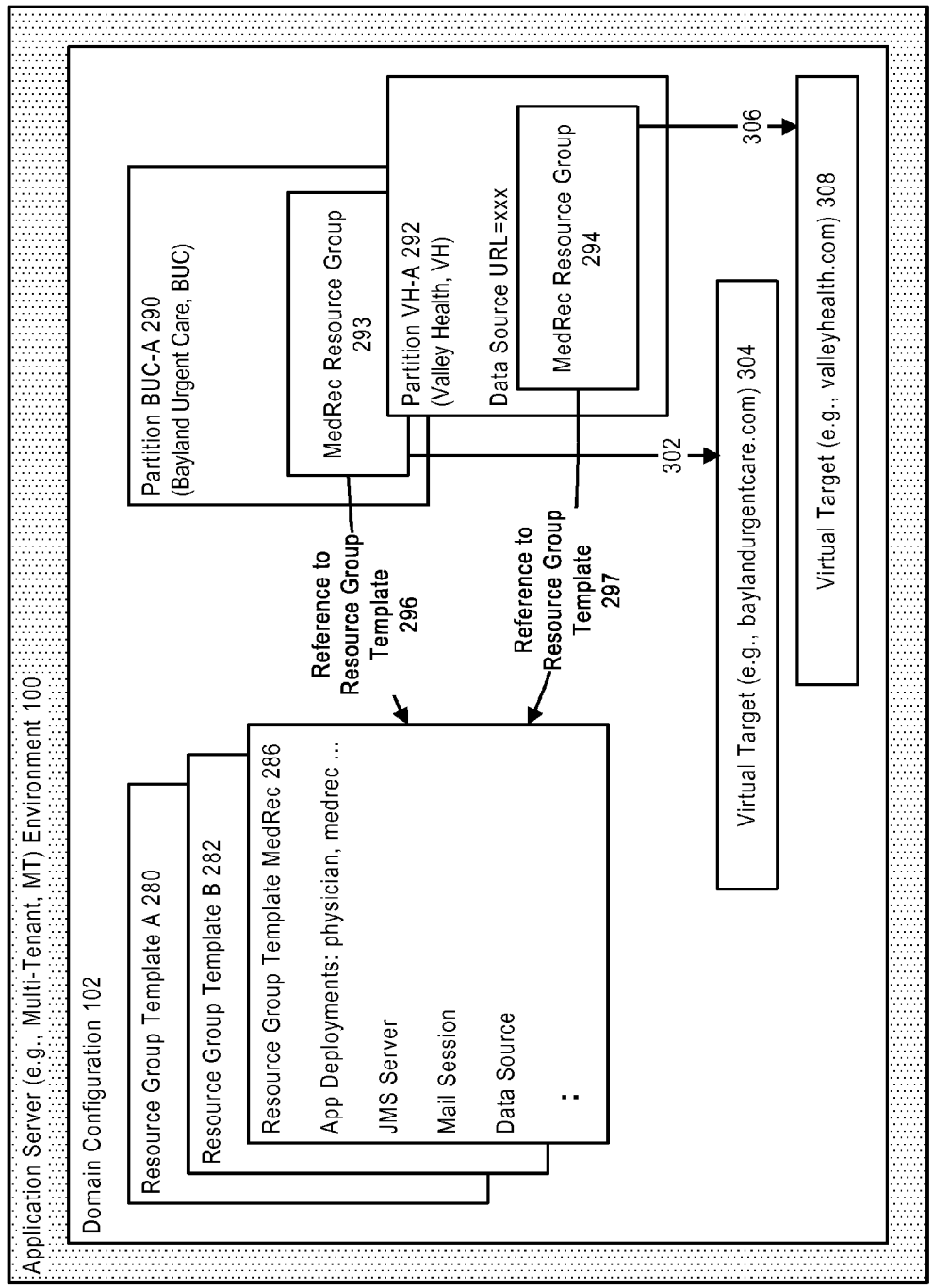
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
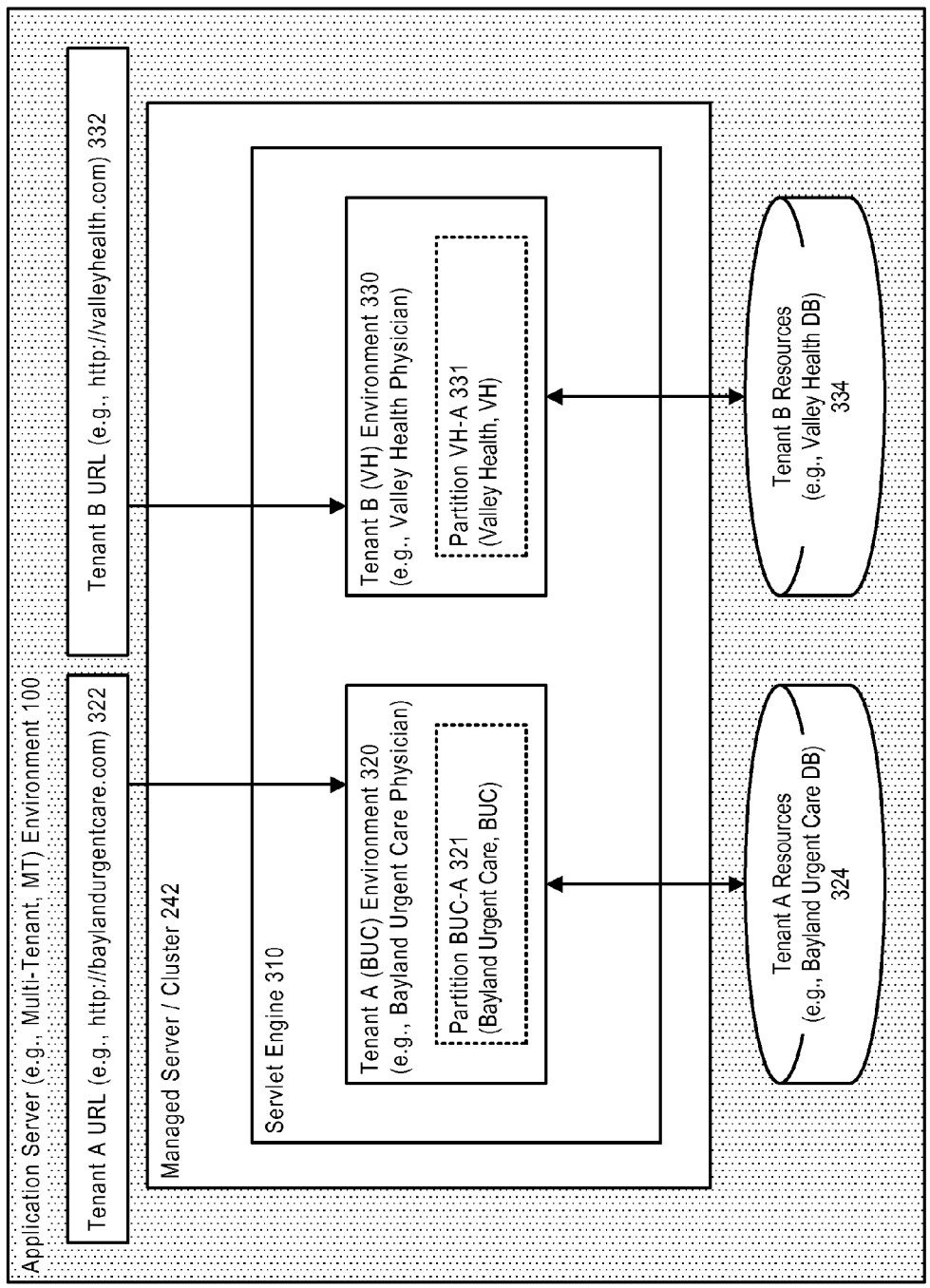
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Web Container Partitions

As described above, in a multitenant environment, an application can be deployed to one or more partitions. When receiving requests for accessing a particular application, a web container needs to be able to discriminate the requests, so that the requests can be dispatched to an appropriate partition. In addition, the web container needs to isolate administrative/runtime aspects for each partition.

In accordance with an embodiment, described herein is a system and method for providing web container partitions in an application server environment. The application server environment can include a domain with one or more partitions, each partition associated with one or more virtual targets, and each virtual target including configuration information for a web server that hosts one or more applications deployed to that virtual target. Each virtual target can register configuration information of its associated web server with a web container. When receiving a request for accessing an application in a particular partition, the web container can examine information in the host header of the request and virtual target configuration information in the web container, to find a matching web server for dispatching the request.

Figure 6:
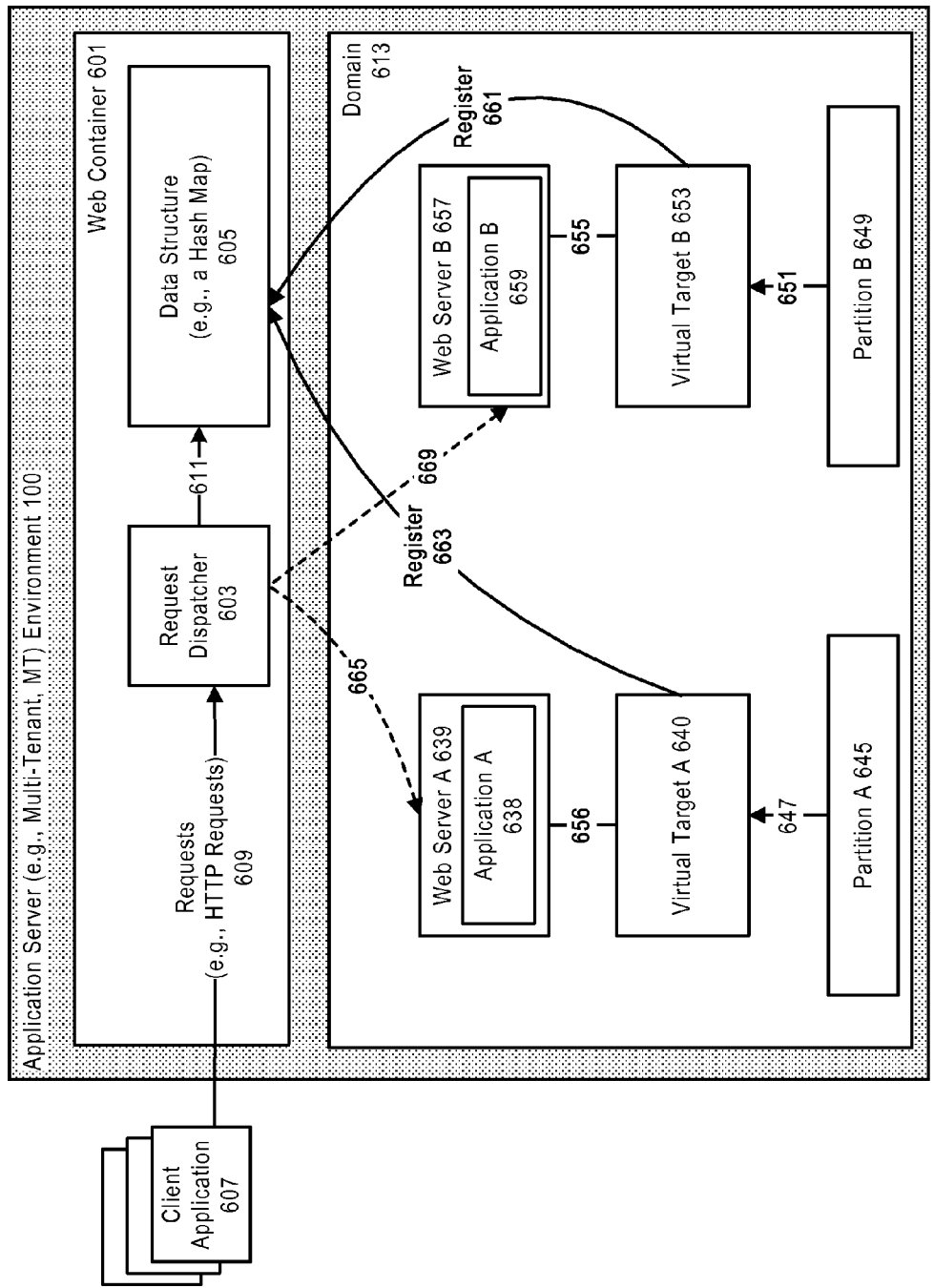
FIG. 6 illustrates a system for providing web container partitions in an application server environment, in accordance with an embodiment.

FIG. 6 illustrates a system for providing web container partitions in an application server environment, in accordance with an embodiment.

As shown in FIG. 6, the application server environment 100 can include a domain with a plurality of partitions (for example, partition A 645 and partition B 649), wherein each partition is associated 647, 651 with one or more virtual targets (for example, virtual target A 640 and virtual target B 653).

In accordance with an embodiment, each virtual target can be associated 656, 655 with a web server (for example, web server A 639 and web server B 657), and include configurations of the web server. When a partition is created, one or more virtual targets and their associated web servers can be created. The web servers can be on a single physical server, which can additionally include a default web server that is not associated with any partition.

In accordance with an embodiment, a web server can be configured to host one or more applications deployed to a partition-level resource group targeted to the virtual target associated with the web server. For example, application A 638, which has been deployed to a resource group in the partition A, can be hosted on the web server A. Similarly, application B 659, which has been deployed to a resource group in the partition B, can be hosted on the web server B.

As further shown in FIG. 6, a web container 601 can include a request dispatcher 603 and a data structure 605, for example a hash map. Each virtual target can register 663, 661 configuration information of its associated web server with the web container, and store the configuration information in the data structure. The configuration information can include a host name of the web server, a port number and a URI prefix.

When receiving a request 609 from a client application 607, the web container can examine the request URL, and use host header information in the request to search 611 for a matching web server in the data structure, and dispatch the request to the matching web server 665, 669 associated with a partition. If no matching web server is found, the request can be automatically dispatched to a default web server.

Figure 7:
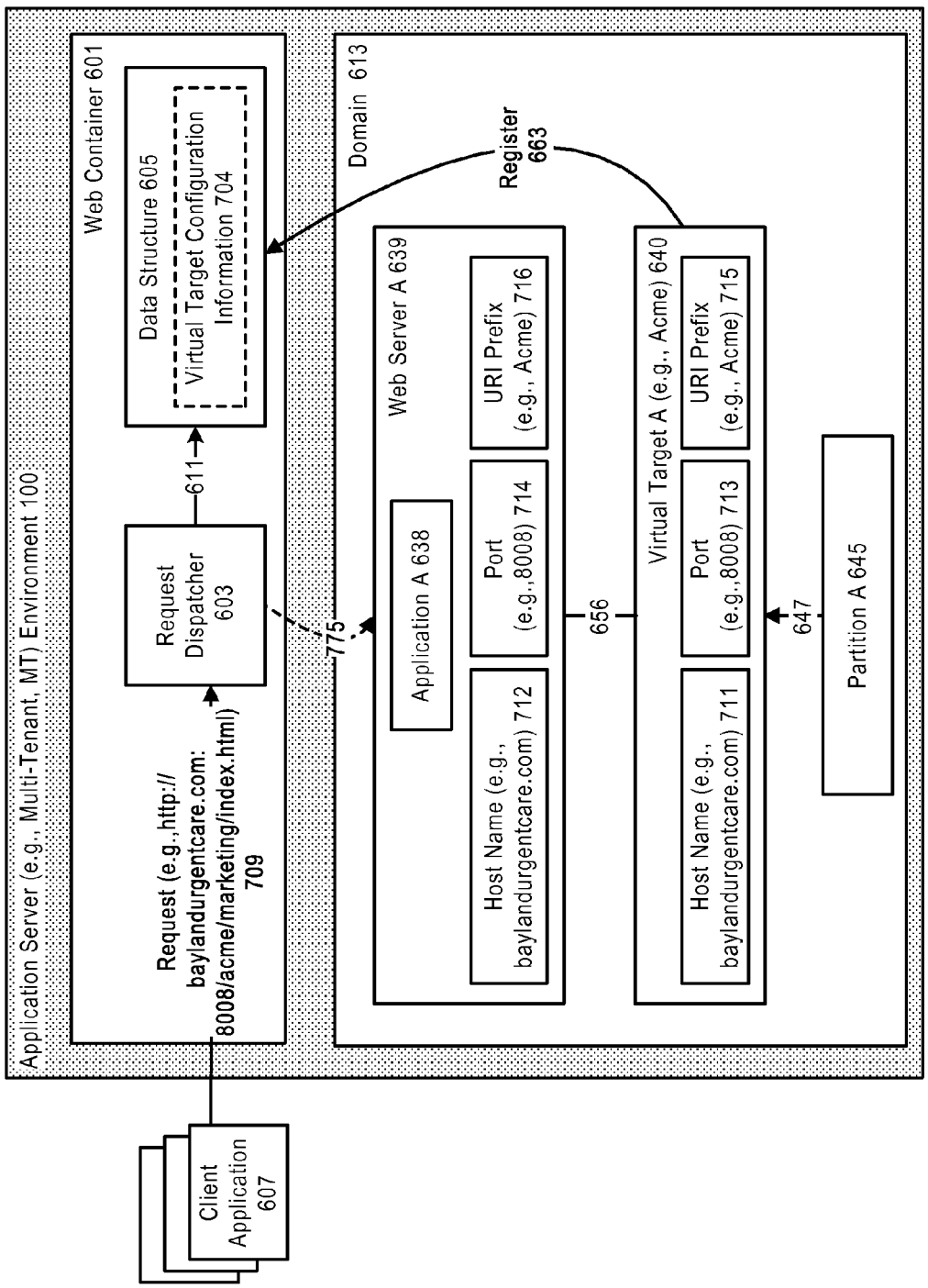
FIG. 7 illustrates a system for providing web container partitions in an application server environment, in accordance with an embodiment.

FIG. 7 further illustrates a system for providing web container partitions in an application server environment, in accordance with an embodiment.

As shown in FIG. 7, the web server A can be associated with a host name 712, a port number 714 and a URI prefix 716; and can host an application, for example an application "marketing". The virtual target A can include configurations for the web server A.

For example, the configuration information can include a host name "baylandurgentcare.com" 711, a port number "8008" 713, and a URI prefix "acme" 715. The configuration is registered with the web container, and stored in the data structure as part of virtual target configuration information 704. The data structure can further include a mapping between each piece of the virtual target configuration information and a destination, for example a partition, a host name of a web server or a port number.

When a request, for example an HTTP request including the URL http://baylandurgentcare.com:8008/acme/marketing/index.html, is received 709 at the web container, the request dispatcher can examine the URL included in the host header of the request, and use the URL to find a matching web server with a host name "baylandurgentcare.com" that is associated with a partition "acme", and hosts the application "marketing" at the specified port number "8008".

As shown in FIG. 7, the matching web server can be the web server A. The request can subsequently be dispatched 775 to that web server.

In accordance with an embodiment, the web container can use the following approach to determine where to dispatch an HTTP request:

1). Web container can examine the "Host" HTTP header, if it finds a virtual target matching the DNS name in the header, it can dispatch the request to the web server associated with the virtual target.
2). Web container can examine the IP and port number that the request was received on, if it finds a virtual target matching the channel, it can dispatch the request to that web server associated with that virtual target.
3). Web container can examine the partition URI in the request URL, if it finds a partition matching the partition URI, it can dispatch the request to the web server associated with the partition.
4). All other cases, the request is dispatched to a default web server.

Execution Environment Isolation

In accordance with an embodiment, the web container can isolate the execution environment of each web application associated with a partition. The environment entities that can be isolated are:

RuntimeMBeans: There are two runtime MBeans exposed by the web container. The first runtime MBean (for example, WebAppComponentRuntimeMBean) represents runtime metrics of a web application (for example, WebAppComponentRuntimeMBean); and can be partitioned along with its parent MBbean (for example, ApplicationRuntimeMBean). The second runtime MBean (for example, WebServerRuntimeMBean) represents runtime metrics of a web server/virtual target is not partition specific.

Java Naming and Directory Interface (JNDI): The web container can create an application scoped JNDI context for each Servlet Context instance. These JNDI contexts are not shared among web applications.

Servlet Context: If a web application is deployed to a resource group template referenced by multiple partitions, the web application can be deployed to each partition. As such, the servlet context instance is not shared.

Other environment entities that can be isolated include application temporary file locations and logging files.

In an accordance with embodiment, a servlet context, which is a configuration object created when a web application is started, can contain different initialization parameters that can be configured in a configuration file. For example, the servlet context can contain a context path, which is a path prefix of a request URI. A request URI can typically include a context path, a server path and application path information.

In accordance with an embodiment, when a web application is deployed to a resource group template or a resource group of a partition, where the resource group is targeted to a virtual target which has URI prefix configured, the URI prefix can be part of the context path.

As an illustrative example, a context path and a servlet path of a web application can be specified in Listings 1 and 2, as shown below:

Listing 1

```
//Configuration in weblogic.xml:
<weblogic-web-app>
    <context-root>/catalog</context-root>
</weblogic-web-app>
```

Listing 2

```
//Configuration in web.xml:
<web-app>
    <servlet-mapping>
        <servlet-name>LawnServlet</servlet-name>
        <url-pattern>/lawn/*</url-pattern>
    </servlet-mapping>
</web-app>
```

As shown above, Listings 1 and 2 define "/catalog" as the context path, and "/lawn" as the servlet path. The "/*" after the servlet path indicates that the path information can be "/index.html". The web application can be accessed by a request with a URI in the format of "/catalog/lawn/index.html".

However, as described above, when a virtual target targeted by a partition-level resource group is configured with a URI prefix (as illustrated in Listing 3 below), the URI prefix can be part of the context path.

Listing 3

```
//Configuration in virtual-target:
<virtual-target>
    <host-name>cloud.oracle.com</host-name>
    <uri-prefix>/valleyhealth</uri-prefix>
</virtual-target>
```

As shown above, the URI prefix "/valleyhealth" specified by the virtual target can be part of a context path of a particular application deployed to a partition-level resource group targeted to the virtual target. As such, a request with a URI in the format of "valleyhealth/catalog/lawn/index.html" can be dispatched to the particular application.

In accordance with an embodiment, when the web container processes an HTTP request, a plurality of server components in the application server environment (for example JNDI, JDBC, EJB container, security, and logging) can be involved; and each of the partition-aware server components on an invocation chain needs partition information to properly support scoping. As such, an identity of a partition needs to be established before invoking a partition-aware server component.

In accordance with an embodiment, the web container can establish the partition identity at the entry point of processing the HTTP request, so that down-stream server components can obtain the partition information. The web container can use a component invocation context (CIC) to hold information about the partition, application, module, and component as thread local state; and propagate the CIC context directly through a CIC contexet manager (for example, ComponentInvocationContextManager), or indirectly through a work manager (for example, WorkManager).

In accordance with an embodiment, the web container needs to ensure that a correct CIC is pushed to or popped from a thread. For example, the thread can be a worker thread for processing an HTTP request or for asynchronous processing; or a timer thread for invalidating expired HTTP session, or for invoking timeout methods on all kinds of Listener interfaces.

Figure 8:
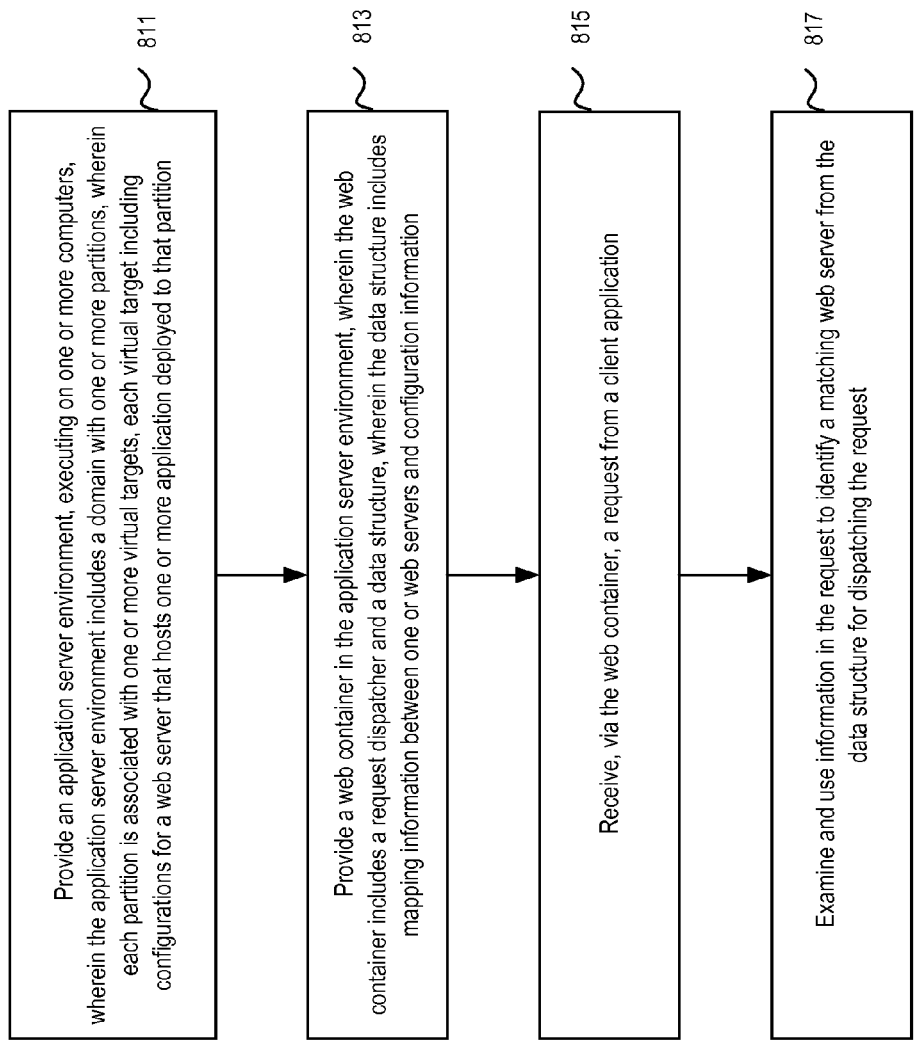
FIG. 8 illustrates a method for providing web container partitions in an application server environment, in accordance with an alternative embodiment.

FIG. 8 illustrates a method for providing web container partitions in an application server environment, in accordance with an embodiment.

As shown in FIG. 8, at step 811, an application server environment, executing on one or more computers, can include a domain with one or more partitions, wherein each partition is associated with one or more virtual targets, each virtual target including configurations for a web server that hosts one or more applications deployed to that partition.

At step 813, a web container in the application server environment can be provided, wherein the web container includes a request dispatcher and a data structure, wherein the data structure includes mapping information between one or web servers and configuration information.

At step 815, the web container can receives a request from a client application.

At step 817, the web container can examine and use information in the request to identify a matching web server from the data structure for dispatching the request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing web container partitions in an application server environment, comprising:
   providing an application server executing on one or more computers, that includes a web container with a data structure, and a domain, wherein the domain includes a plurality of partitions, a web server for each partition, and a virtual target for each partition,
   wherein each of the plurality of partitions represents a runtime and administrative subdivision of the domain, and is configured to include a plurality of one or more applications hosted on the web server for the partition through a configuration, and wherein the virtual target for the partition includes configuration information for the web server that hosts the one or more applications;

registering the configuration information for the web server for each partition with the web container via the virtual target for that partition and storing the registered configuration in the data structure in the web container;

receiving, via the web container, a request from a client application;

examining the request to determine information in the request; and using the information in the request to identify a web server for dispatching the request based on a match between the information in the request and registered configuration information in the data structure.

2. The method of claim 1, wherein, when a matching web server is not found, the request is dispatched to a default web server in the domain.

3. The method of claim 1, wherein the configuration information in the virtual target includes a host name, a port number and a URI prefix.

4. The method of claim 3, wherein the URI prefix identify a partition associated with that virtual target.

5. The method of claim 1, wherein the information used to identify a matching server is URL information in a host header of the request.

6. The method of claim 1, wherein the request is a HTTP request, and wherein the data structure is a hash map.

7. The method of claim 1, wherein when the web container processes the request, one or more components in the domain are partition-aware to support scoping.

8. The method of claim 7, wherein a partition identity is established before the partition-aware components are invoked, wherein the web container establishes the partition identity at the entry point of processing the request so that down-stream components can get information of the partition.

9. The method of claim 7, wherein a component invocation context (CIC) is used to contain information for a partition, an application, and a module.

10. A system for providing web container partitions in an application server environment, comprising:

one or more computers, each including one or more microprocessors;

an application server, executing on the computers, that includes a web container with a data structure, and a domain, wherein the domain includes a plurality of partitions, a web server for each partition, and a virtual target for each partition;

wherein each of the plurality of partitions represents a runtime and administrative subdivision of the domain, and is configured to include a plurality of one or more applications hosted on the web server for the partition through a configuration;

wherein the virtual target for the partition includes configuration information for the web server that hosts the one or more applications;

wherein the configuration information for the web server for each partition is registered with the web container via the virtual target for that partition and stored in the data structure therein;

wherein the web container, when receiving a request, operates to examine the request, and use information in the request to identify a web server for dispatching the request based on a match between the information in the request and registered configuration information in the data structure.

11. The system of claim 10, wherein, when a matching web server is not found, the request is dispatched to a default web server in the domain.

12. The system of claim 10, wherein the configuration information in the virtual target includes a host name, a port number and a URI prefix.

13. The system of claim 12, wherein the URI prefix identify a partition associated with that virtual target.

14. The system of claim 10, wherein the information used to identify a matching server is URL information in a host header of the request.

15. The system of claim 10, wherein the request is a HTTP request, and wherein the data structure is a hash map.

16. The system of claim 10, wherein when the web container processes the request, one or more components in the domain are partition-aware to support scoping.

17. The system of claim 16, wherein a partition identity is established before the partition-aware components are invoked, wherein the web container establishes the partition identity at the entry point of processing the request so that down-stream components can get information of the partition.

18. The system of claim 16, wherein a component invocation context (CIC) is used to contain information for a partition, an application, and a module.

19. A non-transitory computer readable storage medium, including instructions stored thereon which when read and executed by one or more computers cause the one or more computers to perform the steps comprising:

providing an application server executing on one or more computers, that includes a web container with a data structure, and a domain, wherein the domain includes a plurality of partitions, a web server for each partition, and a virtual target for each partition, wherein each of the plurality of partitions represents a runtime and administrative subdivision of the domain, and is configured to include a plurality of one or more applications hosted on the web server for the partition through a configuration, and wherein the virtual target for the partition includes configuration information for the web server that hosts the one or more applications;

registering the configuration information for the web server for each partition with the web container via the virtual target for that partition and storing the registered configuration in the data structure in the web container;

registering, via the virtual target, the configuration information for the web server with the web container and storing the registered configuration in the data structure in the web container;

receiving, via the web container, a request from a client application;

examining the request to determine information in the request; and using the information in the request to identify a web server for dispatching the request based on a match between the information in the request and registered configuration information in the data structure.

20. The non-transitory computer readable storage medium of claim 19, wherein, when a matching web server is not found, the request is dispatched to a default web server in the domain.

* * * * *

UNITED STATES PATENT AND TRADEMARK OFFICE
CERTIFICATE OF CORRECTION

PATENT NO. : 10,084,843 B2  
APPLICATION NO. : 14/799273  
DATED : September 25, 2018  
INVENTOR(S) : Liu et al.

Page 1 of 1

It is certified that error appears in the above-identified patent and that said Letters Patent is hereby corrected as shown below:

On the Title Page

Item (73), the Assignee should be indicated as:  
-- ORACLE INTERNATIONAL CORPORATION, Redwood Shores, CA (US) --

Signed and Sealed this  
Eighteenth Day of June, 2019

Andrei Iancu  
*Director of the United States Patent and Trademark Office*